(12) United States Patent
Nakamura et al.

(10) Patent No.: US 6,225,741 B1
(45) Date of Patent: May 1, 2001

(54) PACKAGE FILM FOR EL PANEL, ITS MANUFACTURE, AND EL PANEL AND LCD MODULE EMPLOYING THE FILM

(75) Inventors: Mitsuo Nakamura, Yokohama; Yoichiro Yabe, Yokosuka, both of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/142,978

(22) PCT Filed: Mar. 31, 1997

(86) PCT No.: PCT/JP97/01101

§ 371 Date: Feb. 3, 1999

§ 102(e) Date: Feb. 3, 1999

(87) PCT Pub. No.: WO97/37516

PCT Pub. Date: Oct. 9, 1997

(30) Foreign Application Priority Data

Mar. 29, 1996 (JP) .................................................. 8-099505

(51) Int. Cl.[7] .................................................. H01J 1/62
(52) U.S. Cl. .................................................. 313/506; 313/512
(58) Field of Search .................................. 313/506, 503, 313/504, 478, 498, 512; 359/82

(56) References Cited

U.S. PATENT DOCUMENTS 4,731,558 * 3/1988 Haisma et al. ..................... 313/478
5,140,450 * 8/1992 Nikaido .............................. 359/82
5,929,561 * 7/1999 Kawami et al. .................... 313/506

FOREIGN PATENT DOCUMENTS

| 59-7750 | 3/1984 | (JP) . |
| 63-14395 | 4/1988 | (JP) . |
| 1-158047 | 6/1989 | (JP) . |
| 5-45505 | 2/1993 | (JP) . |
| 7-27597 | 6/1995 | (JP) . |

* cited by examiner

*Primary Examiner*—Nimeshkumar D. Patel
*Assistant Examiner*—Todd Reed Hopper
(74) *Attorney, Agent, or Firm*—Finnegan, Henderson, Farabow, Garrett & Dunner, L.L.P.

(57) ABSTRACT

An EL panel package film comprises, for example, a PCTFE film or a PET film having a moistureproof layer. This EL panel package film has irregularities of 3 $\mu$m or more in arithmetic average roughness (Ra) and 10 $\mu$m or more in maximum height (Ry) specified in JIS G 0601 on at least one of its surfaces. The EL panel is configured by using the EL panel package film having such surface irregularities as a package film on at least a light emitting surface side. Oscillations produced due to the polarity inversion of an alternate voltage applied to the EL panel are absorbed and dispersed by the irregularities formed on the package film surface. A LCD module has such an EL panel as the backlight. Noise from the LCD cell surface is reduced.

14 Claims, 10 Drawing Sheets

X9.6

X48

X9.6

X48

×9.6

×48

×9.6

×48

×9.6

×48

US 6,225,741 B1

PACKAGE FILM FOR EL PANEL, ITS MANUFACTURE, AND EL PANEL AND LCD MODULE EMPLOYING THE FILM

TECHNICAL FIELD

The present invention relates to an EL panel package film, a method for producing the package film, an EL panel using the EL panel package film and an LCD module using the EL panel, and more particularly to an organic dispersion EL panel and an LCD module using the same.

BACKGROUND ART

Lately, as a lightweight and thin panel illuminant having excellent flexibility in shape, an organic dispersion EL panel is attracting attention among other EL panels (electroluminescent panels). Such an organic dispersion EL panel is extensively used as a backlight for various types of liquid crystal display devices and other various types of display boards such as LCD modules like PDA (personal digital assistant) handy terminals, and for a variety of other uses.

The organic dispersion EL panel has the following configuration. A light emitting layer is configured by having fluorescent particles of ZnS or the like dispersed into an organic polymer. A back electrode made of an Al foil or the like is laminated on one of the surfaces of the light emitting layer with a reflective insulating layer intervened between them. A transparent electrode sheet, which has a transparent electrode made of an ITO deposited film or the like formed on a transparent insulating film, is laminated on the other surface of the light emitting layer. External extension leads are respectively fitted to both the back electrode and the transparent electrode sheet. The lead for the transparent electrode is pressure-welded to a power feed portion, which comprises an Ag paste-applied layer formed on the transparent electrode sheet. The laminate having the layers described above is sealed with a package film to form an organic dispersion EL panel.

Meanwhile, portable compact information terminals such as handy terminals are spreading these days. Demands for a miniaturized liquid crystal display device to be used for such portable compact equipment are increasing. The EL panel used as a backlight for such a small liquid crystal display device is demanded to be made small and thin. Consequently, a EL panel having a thickness of about 0.6 to 0.7 mm is also becoming the mainstream. The EL panel is further tried to be decreased in the thickness.

However, there has occurred a new problem. Specifically, the organic dispersion EL panel applies an alternate voltage to between the transparent electrode and the back electrode to emit light. Therefore, the organic dispersion EL panel produces very small oscillations due to a cycle of polarity inversion of the alternate voltage. On the other hand, where the EL panel is built in as the backlight of an LCD cell or the like, a gap of 1 mm or below is generally between the LCD cell and the EL panel. Very small oscillations may cause resonance in the gap between the LCD cell and the EL panel because of the polarity inversion of the EL panel. It was found that the resonance phenomenon might cause noise from the LCD cell surface.

As means for preventing the EL panel from oscillating, there is known a technique of forming a copper plate on the outside of the back electrode to give an equal potential to the transparent electrode and the copper plate. This three-electrode structure can theoretically eliminate oscillations caused due to the cycle of polarity inversion of the alternate power. But, the oscillation preventing technique, which further adds the copper plate, naturally sacrifices a thickness of the EL panel. Accordingly, in the recent EL panel which is particularly required to be made very thin, the oscillation preventing technique described above cannot remedy noise.

Further, as means for preventing oscillations of the EL panel, an oscillation preventing film may be used, or the EL panel may be fixed to a high rigid substrate. But, such oscillation preventing means involve the increase of a thickness of the EL panel. Therefore, such means cannot be applied at all to the recent EL panels which are demanded to be made very thin.

Accordingly, there is highly demanded for a technique which prevents oscillations caused due to the cycle of polarity inversion of the alternate voltage without adding a particular structure to a conventional EL panel. And, it is demanded to prevent the oscillations of the EL panel and its resonance in the gap between the LCD cell and the EL panel, thereby reducing noise from the LCD cell surface resulting from them.

An object of the present invention is to provide an EL panel which can prevent oscillations due to a cycle of polarity inversion of an alternate voltage without involving the increase or the like of a thickness of the EL panel. Another object of the invention is to provide an LCD module which can reduce noise derived from oscillations of the EL panel. An EL panel package film and its production method of the present invention were achieved in order to prevent the oscillations described above.

DISCLOSURE OF THE INVENTION

The inventors made a devoted study to enable prevention of oscillation caused due to a cycle of polarity inversion of an alternate voltage applied to an EL panel without adding any particular structure to a conventional EL panel and found as a result that resonance in a gap with, for example, an LCD cell can be suppressed by absorbing and dispersing oscillations produced from the EL panel by means of the components themselves of the conventional EL panel. The present invention was completed based on such knowledge.

An EL panel package film of the invention is characterized by having irregularities of 3 $\mu$m or more in arithmetic average roughness (Ra) specified in JIS G 0601 on at least one of its surfaces. Otherwise, it is an EL panel package film having irregularities of 10 $\mu$m or more in maximum height (Ry) specified in JIS G 0601 on at least one of its surfaces. It is particularly desirable that the EL panel package film of the invention has irregularities meeting both the above-described Ra and Ry conditions.

Here, the arithmetic average roughness Ra specified in JIS G 0601 denotes a value determined as follows. First, a standard length L is removed from a roughness curve in a direction of its average line. An x-axis is determined in a direction of the average line of the removed portion and a y-axis determined in a direction of a vertical magnification. When it is assumed that the roughness curve of the pertinent portion is expressed in y=f(x), a value determined by the following expression is Ra ($\mu$m).

$$Ra = 1/L \int_o^L |f(x)| dx$$

And, the maximum height Ry specified in JIS G 0601 denotes a value determined as follows. First, a standard length L is removed from the roughness curve in a direction of its average line. A space between the peak line and the root line of the removed portion is measured in a direction of the vertical magnification of the roughness curve, and a value thus obtained is Ry ($\mu$m). The roughness curve is a curve resulting from removing a surface waviness component longer than a predetermined wave length from a profile curve which appears when a subject face is cut by a plane perpendicular to the subject face.

Another EL panel package film of the invention is characterized by having irregularities arranged with a pitch of 1.0 mm or below on at least one of its surfaces. Still another EL panel package film of the invention is characterized by having irregularities with a noise reduction effect at on at least one of its surfaces.

And, a method for producing the EL panel package film of the invention is characterized by embossing at least one of the surfaces of the package film with a pitch of 0.3 to 1.0 mm.

An EL panel of the invention is characterized by comprising an EL element section having an emitter layer containing dispersed fluorescent particles, a transparent electrode layer arranged to integrally oppose one of the main surfaces of the emitter layer and a back electrode layer laminated on the other main surface of the emitter layer with a reflective insulating layer interposed therebetween; a pair of leads respectively attached to the transparent electrode layer and the back electrode layer; and a pair of package films having the EL element portion interposed therebetween, wherein at least the package film disposed on the side of the light-emitting surface out of the pair of package films is configured of the EL panel package film of the invention described above. The EL panel package film of the invention is arranged to have the irregularities described above positioned on the surface configuring at least the panel surface.

The LCD module of the invention is characterized by having the EL panel of the invention described above.

The EL panel package film of the invention has the irregularities of 3 $\mu$m or more of Ra or the irregularities of 10 $\mu$m or more of Ry formed on at least one of its surfaces. Otherwise, it has the irregularities arranged with a pitch of 1.0 mm or below. Such irregularities on the package film surface have an effect of absorbing and dispersing the oscillations caused due to a cycle of polarity inversion of the alternate voltage applied to the EL panel.

Therefore, an EL panel using the package film described above can prevent the oscillations described above without adding a special structure for preventing the oscillations. Specifically, the aforementioned oscillations can be prevented without involving the occurrence of Newton's ring, moire or the like, still keeping a thin panel structure. Further, the LCD module configured by using the EL panel described above prevents the resonance of oscillations of the EL panel in the gap between the LCD cell and the EL panel. Thus, noise from the LCD cell surface due to the resonance described above can be reduced.

MODE FOR CARRYING OUT THE INVENTION

Figure 1:
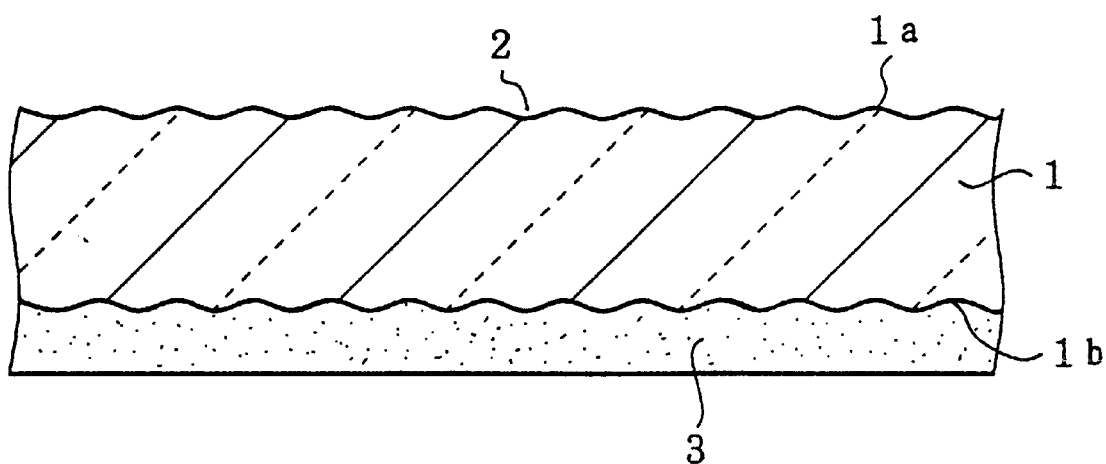
FIG. 1 is a sectional view showing the configuration of one embodiment of the EL panel package film of the invention.

Modes for carrying out the invention will be described.

The EL panel package film of the invention has irregularities having a noise reduction effect on at least one of its surfaces. The irregularities having the noise reduction effect include irregularities satisfying at least either of 3 $\mu$m or more in arithmetic average roughness (Ra) or 10 $\mu$m or more in maximum height (Ry) specified in JIS G 0601. Otherwise, the irregularities may be arranged with a pitch of 1.0 mm or below.

Such irregularities on the surface of a package film have a good noise reduction effect. Therefore, by using an EL panel package film having the above-described irregularities on at least one of the surfaces, oscillations caused due to a cycle of polarity inversion of an alternate voltage applied to the EL panel can be absorbed and dispersed.

The irregularities on the package film surface may be sufficient when they meet at least one of Ra$\geq$3 $\mu$m and Ry$\geq$10 $\mu$m as described above. When the irregularities on the surface of the package film is less than 3 $\mu$m in Ra and also less than 10 µm in Ry, a noise reduction effect by the irregularities on the surface cannot be obtained satisfactorily. Upper limits of Ra and Ry of the surface irregularities are not especially limited but determined as required depending on a thickness or the like of the package film.

Especially, a good noise reduction effect can be obtained when fine irregularities are present continuously, so that it is preferable to apply irregularities having Ra of 3 µm or more. Further, irregularities meeting both Ra≧3 µm and Ry≧10 µm have a much better noise reduction effect. Therefore, a package film having the surface irregularities meeting both Ra≧3 µm and Ry≧10 µm is particularly preferable in the present invention.

The package film having the surface irregularities described above can be produced by applying a variety of production methods. For example, the irregularities meeting the above-described conditions can be formed on the surface of a package film with ease by embossing with a pitch of, for example, 0.3 to 1.0 mm.

If a pitch of irregularities exceeds 1.0 mm when embossing, the surface irregularities having a good noise reduction effect cannot be obtained. Meanwhile, if the pitch of irregularities while embossing is narrow to less than 0.3 mm, the obtained irregularities might have an insufficient height (depth). In such a case, a noise reduction effect of the surface irregularities is lowered. Therefore, it is preferable to emboss with a pitch of 0.3 to 1.0 mm. Thus, the surface irregularities of the package film of the invention may be irregularities arranged, e.g., embossed, with a pitch of 1.0 mm or below.

For the EL panel package film of the invention, an insulating resin film having light transmission properties is used basically. Here, the EL panel package film is generally required to have moistureproofness. Where moistureproofness is required, a transparent resin film having moistureproofness is used. Such a film is preferably polychlorotrifluoroethylene (PCTFE) film.

FIG. 1 is a sectional view schematically showing a structure of the EL panel package film made of a PCTFE film 1. Irregularities 2 meeting the conditions described above are formed on surfaces 1a, 1b of the PCTFE film 1 having a thickness of about 50 to 250 µm. The first surface 1a configures the outermost surface of the EL panel. An adhesive agent layer 3 is formed in a thickness of about 30 to 70 µm on the second surface 1b. The second surface 1b is adhered to an EL element portion to be described afterward by thermal contact bonding or the like. Therefore, formation of the irregularities 2 on only the first surface 1a of the PCTFE film 1 achieves an initial object.

Figure 2:
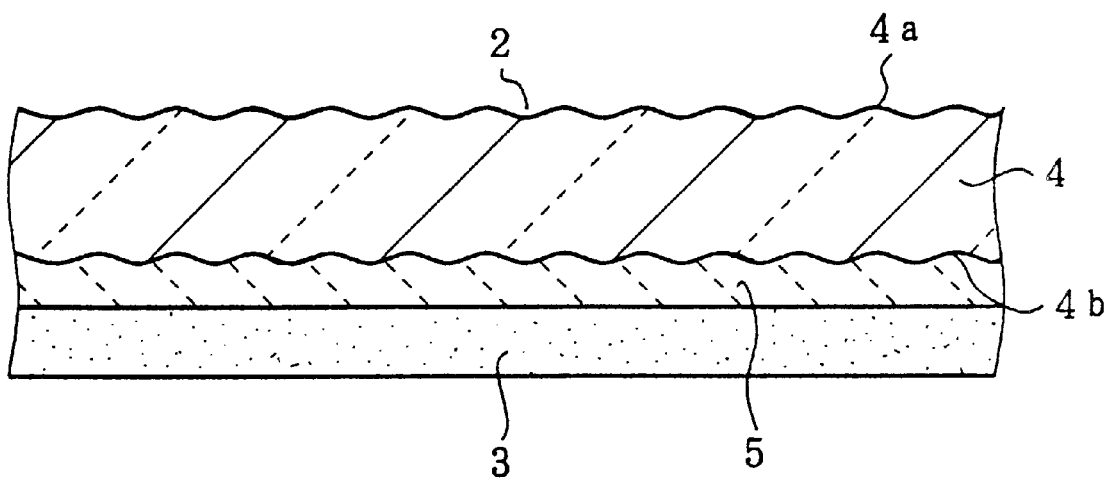
FIG. 2 is a sectional view showing the configuration of another embodiment of the EL panel package film of the invention.

Another example of the package film having moistureproofness has a moistureproof layer 5, which comprises an SiOx deposited film or AlOx deposited film of about 10 to 50 nm formed on a second surface 4b of a polyester (PET) film 4 having a thickness of about 12 to 100 µm as shown in FIG. 2. The PET film 4 itself is poor in moistureproofing performance but can be used as a package film having moistureproofness by forming the moistureproof layer 5 such as an SiOx deposited film or AlOx deposited film on the surface 4b. The moistureproof layer 5 may be formed of a plurality of layers.

Irregularities 2 meeting the above-described conditions are formed on a first surface 4a of the PET film 4. The first surface 4a configures the outermost surface of the EL panel. The irregularities 2 may not be particularly formed on the second surface 4b. An adhesive agent layer 3 is formed to a thickness of about 30 to 70 µm on the second surface 4b.

The package film may not be required to particularly have moistureproofness depending upon usage of the EL panel. Moistureproofness is also met by a component element other than the package film depending upon a configuration of the EL panel. In such a case, the PET film can be used solely for the package film. A specific configuration is the same as the PCTFE film 1 shown in FIG. 1.

A package film comprising a material other than that described above can also be used as the EL panel package film of the invention if it is a transparent insulating film having properties suitable for usage or a transparent insulating film having an additional layer.

Now, one embodiment having the EL panel of the invention applied to an organic dispersion EL panel is described with reference to FIG. 3A and FIG. 3B.

Figure 3A:
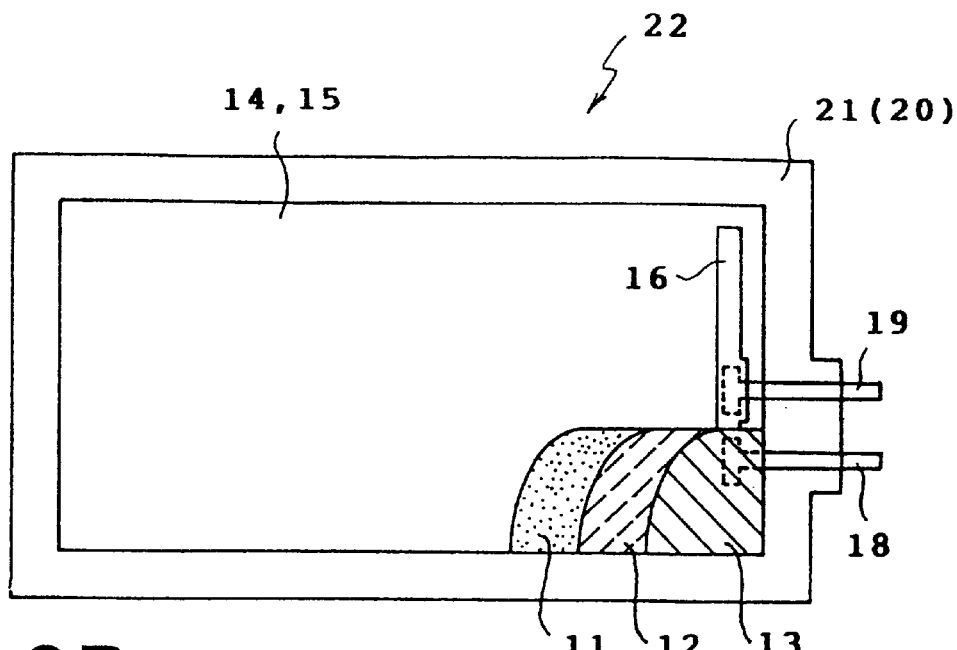
FIG. 3A and FIG. 3B are diagrams showing the configurations of one embodiment of the EL panel of the invention, FIG. 3A being a partially cutaway plan view, and FIG. 3B being a sectional view.
Figure 3B:
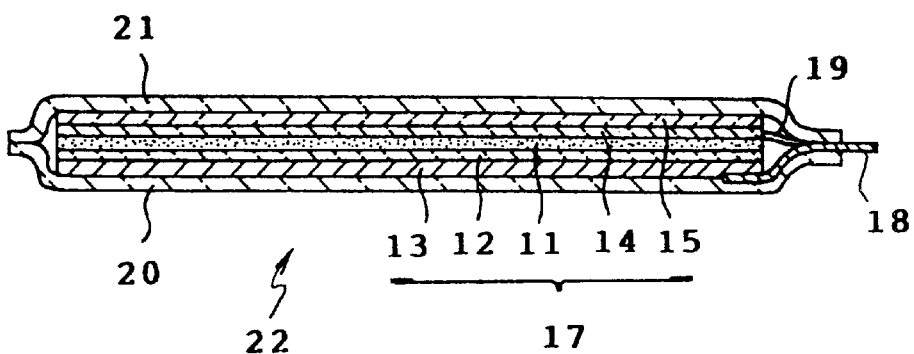

FIG. 3A and FIG. 3B show a configuration of one embodiment of the organic dispersion EL panel. In these drawings, 11 denotes an emitter layer which has fluorescent particles of ZnS or the like dispersed and contained into an organic polymer, such as cyanoethyl cellulose, having a high dielectric constant. A reflective insulating layer 12, which has high reflective inorganic oxide powder of, for example, $TiO_2$ or $BaTiO_3$, dispersed and contained into an organic polymer, such as cyanoethyl cellulose, having a high dielectric constant, is laminated on one of the main surfaces of the emitter layer 11. A back electrode layer 13 made of a metal foil or metal film of, for example, Al, is integrally laminated on one of the main surfaces of the emitter layer 11 with the reflective insulating layer 12 interposed between them.

On the other main surface of the emitter layer 11, a transparent electrode layer (transparent electrode sheet) 14, which has adhered a transparent electrode made of an ITO deposited film or the like onto a transparent insulating film such as a polyester film, and a moisture-absorbing layer 15 made of a moisture-absorbing film such as 6-nylon film are laminated integrally in this order. The moisture-absorbing layer 15 is arranged as required. The ITO deposited film is arranged to oppose the emitter layer 11. A print layer of a conductive paste such as Ag paste is formed as a power feed portion 16 on the ITO deposited film.

A laminate 17, which comprises the back electrode layer 13, the reflective insulating layer 12, the emitter layer 11, the transparent electrode layer 14 and the moisture-absorbing layer 15 described above, is, for example, thermally contact bonded. This laminate (thermal contact bonded body) 17 configures an EL element portion. Among them, a back electrode lead 18 is fitted to the back of the back electrode layer 13. And, a transparent electrode lead 19 is fitted to the power feed portion 16 of the transparent electrode layer 14 in a state interposed between the transparent electrode layer 14 and the emitter layer 11.

Package films 20, 21 are formed on both sides of the laminate 17 configuring the EL element portion to hold between them. Extra portions along the outer peripheries of the package films 20, 21 which are paired as the front and back are thermally contact bonded to seal the EL element portion 17. Thus, an organic dispersion EL panel 22 is configured.

Between the package films 20, 21 paired as the front and back, the package film 21 which is formed on the side of at least the transparent electrode layer 14 is made of the EL panel package film of the invention. Specifically, as the package film disposed on the light-emitting surface, the EL panel package film made of the PCTFE film 1 shown in FIG. 1 or the PET film 4 or the like having the moistureproof layer 5 shown in FIG. 2 is used. It is also preferable to use the EL panel package film of the invention for the package film 20 which is formed on the side of the back electrode layer 13.

The organic dispersion EL panel 22 has the same configuration as the conventional organic dispersion EL panel excepting that the irregularities are formed on the surface of the package film 21 which is formed on at least the light-emitting surface. In other words, the basic configuration is not especially changed from the conventional EL panel. In the organic dispersion EL panel 22, the oscillations caused due to a cycle of polarity inversion of an alternate voltage applied to the EL panel are absorbed and dispersed by the irregularities formed on the surface of the package film 21 (20). Namely, the above-described oscillations can be prevented without adding a special configuration for preventing the oscillations. Therefore, Newton's ring, moire or the like is not produced, or a thickness of the panel is not increased.

Since the organic dispersion EL panel 22 can suppress oscillations while keeping a thin panel structure, it is suitable as a backlight or the like for a miniaturized liquid crystal display device such as a liquid crystal display device of a portable compact information terminal like a handy terminal. Thus, the organic dispersion EL panel 22 is used as a backlight for an LCD cell for example.

Such an LCD module is configured by incorporating the organic dispersion EL panel 22 as the backlight for the LCD cell. At this time, a gap of 1 mm or below is generally present between the EL panel and the LCD cell as described above. The conventional EL panel had resonance of oscillations of the EL panel in the gap between the EL panel and the LCD cell, causing noise from the LCD cell surface.

The organic dispersion EL panel 22 has a function to absorb and disperse the oscillations themselves resulting from the cycle of polarity inversion of an alternate voltage applied as described above. Further, resonance of the oscillations of the EL panel can be prevented in the gap between the EL panel and the LCD cell. Accordingly, it becomes possible to reduce the noise from the LCD cell surface caused by the resonance described above. This noise reduction makes great contributions to the improvement of reliability of the LCD module and its peripheral equipment.

Now, specific embodiments of the invention and evaluation results will be described.

Embodiment 1

First, ten PCTFE films having a thickness of 200 $\mu$m were prepared. They were embossed with a pitch of 0.5 mm. Thus, ten EL panel package films with irregularities of 0.5-mm pitches formed on the surfaces of the PCTFE films were prepared.

These ten package films were measured for surface roughness by a surface roughness measuring apparatus (manufactured by Rank Taylor Hobson, Form Talysurf S4H). As a result, Ra was 3.0 to 3.5 $\mu$m and Ry was 12.0 to 15.0 $\mu$m.

Figure 4A:
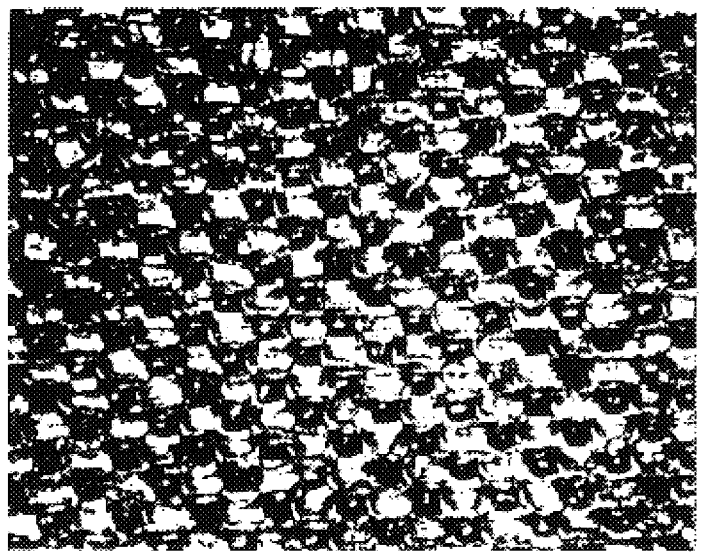
FIG. 4A and FIG. 4B are enlarged micrographs showing the surface conditions of the EL panel package film of the first embodiment of the invention, FIG. 4A being a micrograph magnified to 9.6 times, and FIG. 4B being a micrograph magnified to 48 times.
Figure 4B:
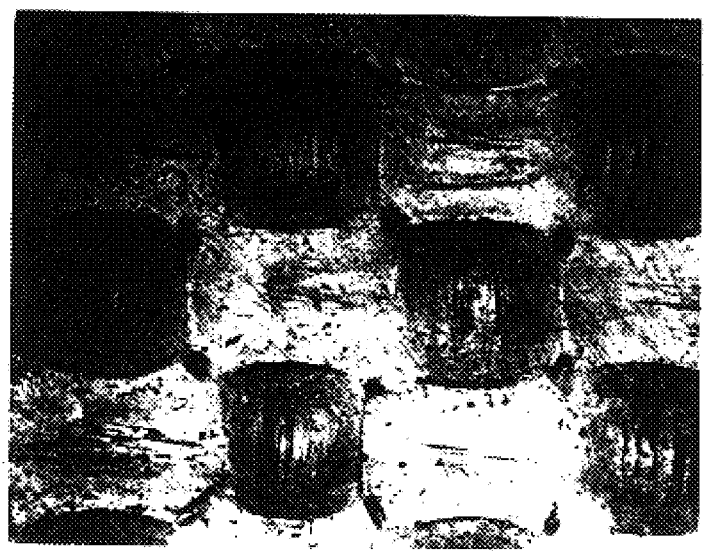
Figure 5:
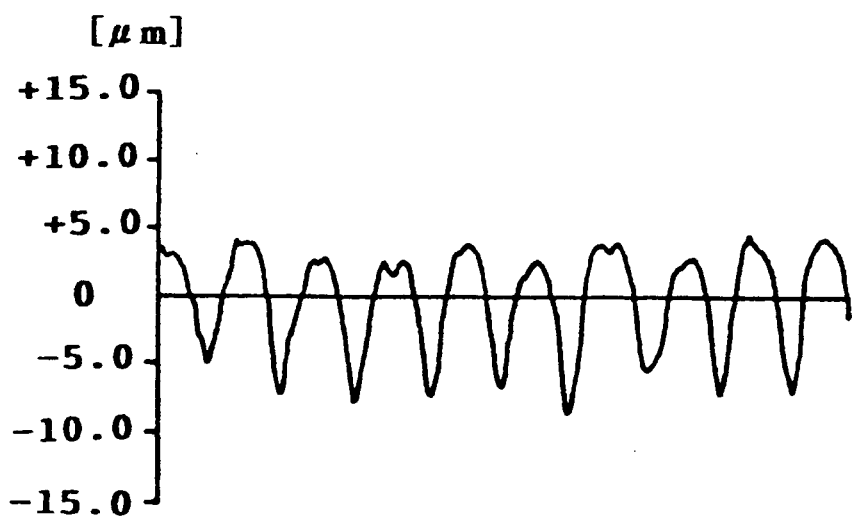
FIG. 5 is a chart showing a result of measurement of the surface roughness of the EL panel package film of the first embodiment of the invention.

FIG. 4A and FIG. 4B show the surface condition of the EL panel package film of Embodiment 1 in enlarged states. FIG. 4A is an enlarged micrograph of 9.6 times, and FIG. 4B is an enlarged micrograph of 48 times. FIG. 5 is a chart of result obtained by measuring the surface roughness of the EL panel package film of Embodiment 1.

Figure 6:
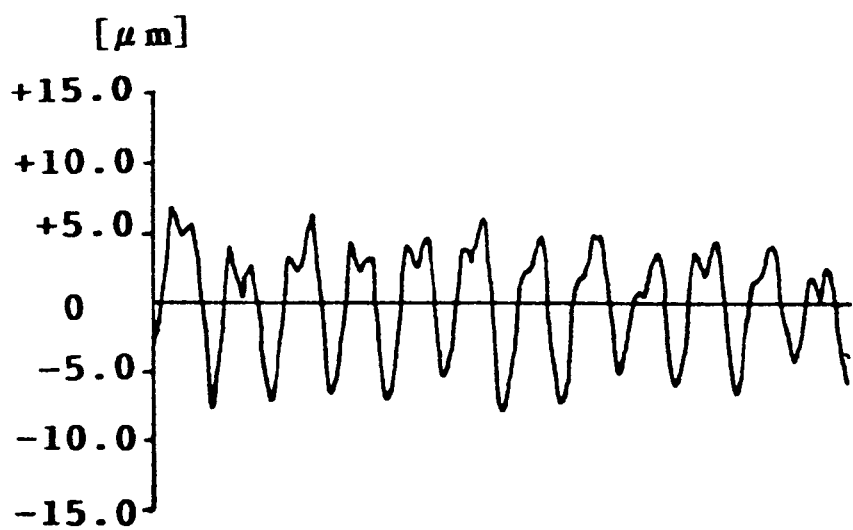
FIG. 6 is a chart showing a result of measurement of the surface roughness of the EL panel produced using the EL panel package film of the first embodiment of the invention.

As described afterward, the EL panel package film of Embodiment 1 was used to produce an EL panel. FIG. 6 shows a chart of results obtained by measuring the surface roughness of the EL panel produced by using the EL panel package film. It is apparent from FIG. 5 and FIG. 6 that the irregularities are held on the package film surface even after producing the EL panel.

Embodiment 2

Ten PCTFE films having a thickness of 150 $\mu$m were prepared. They were embossed with a pitch of 0.7 mm. Thus, ten EL panel package films with irregularities of 0.7-mm pitches formed on the surfaces of the PCTFE films were prepared. These ten package films were measured for the surface roughness by the surface roughness measuring apparatus in the same manner as in Embodiment 1. As a result, Ra was 3.2 to 3.6 $\mu$m and Ry was 12.5 to 16.0 $\mu$m.

Comparative Example 1

Ten PCTFE films having a thickness of 200 $\mu$m were prepared. These PCTFE films were measured for the surface roughness by the surface roughness measuring apparatus. As a result, Ra was 0.3 to 0.5 $\mu$m and Ry was 1.2 to 2.0 $\mu$m. These ten PCTFE films were used as they were as the EL panel package film.

Figure 7A:
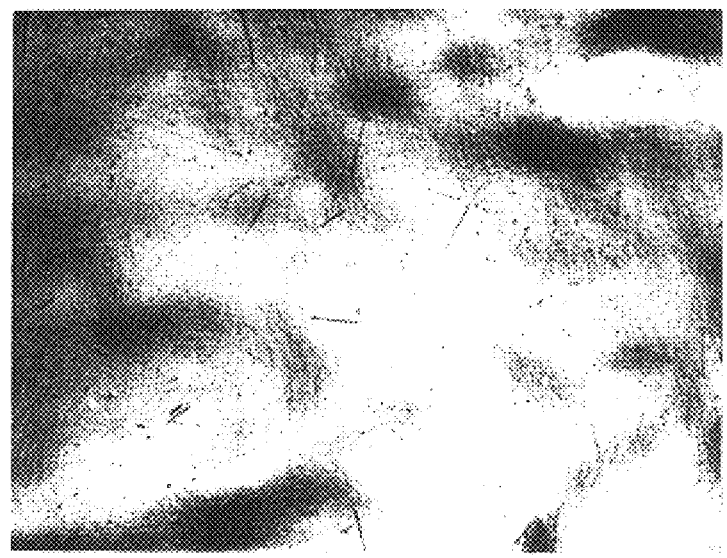
FIG. 7A and FIG. 7B are enlarged micrographs showing the surface conditions of the EL panel package film of Comparative Example 1, FIG. 7A being a micrograph magnified to 9.6 times, and FIG. 7B being a micrograph magnified to 48 times.
Figure 7B:
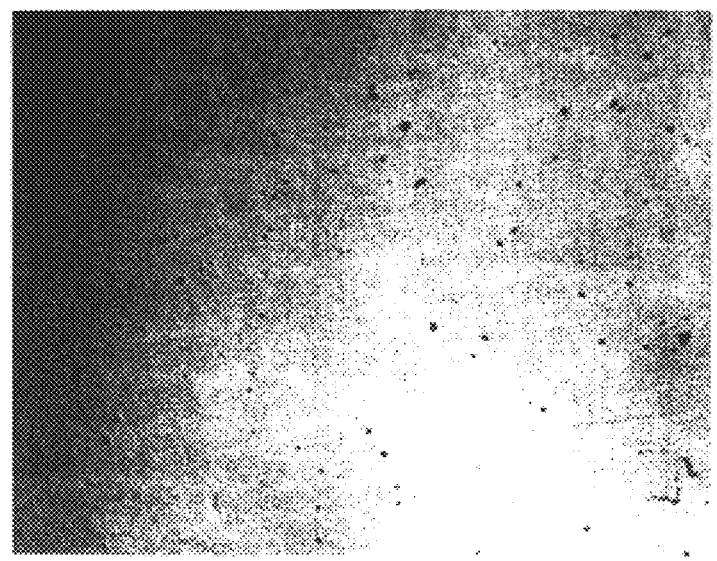
Figure 8:
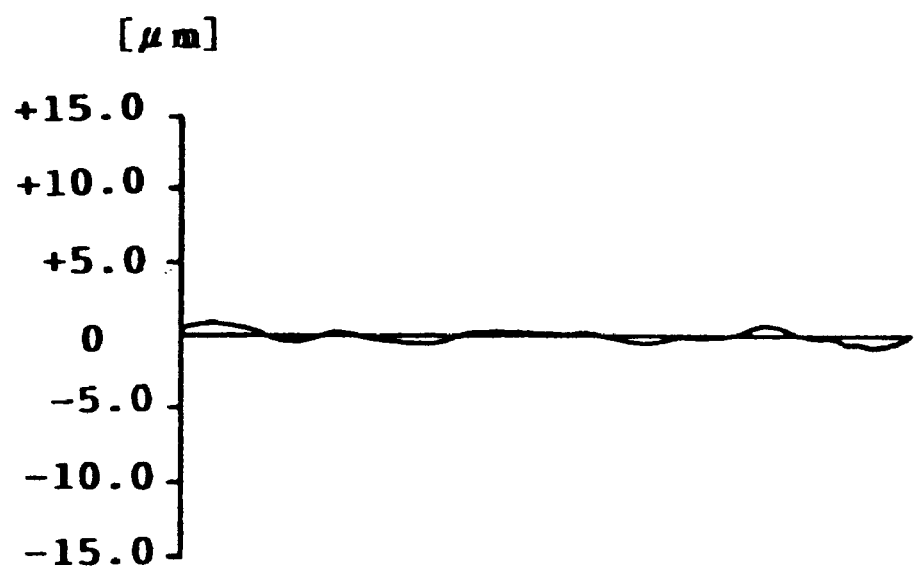
FIG. 8 is a chart showing a result of measurement of the surface roughness of the EL panel package film of Comparative Example 1.

FIG. 7A and FIG. 7B show the surface condition of the EL panel package film of Comparative Example 1 in enlarged states. Magnifications were the same as in Embodiment 1. FIG. 8 shows a chart of results obtained by measuring the surface roughness of the EL panel package film of Comparative Example 1.

Comparative Example 2

Thirty PCTFE films having a thickness of 200 $\mu$m were prepared. Three types of grid patterns (pattern A, pattern B, pattern C) were transferred onto these films. Ten films each having patterns A, B, C transferred were produced.

Figure 9A:
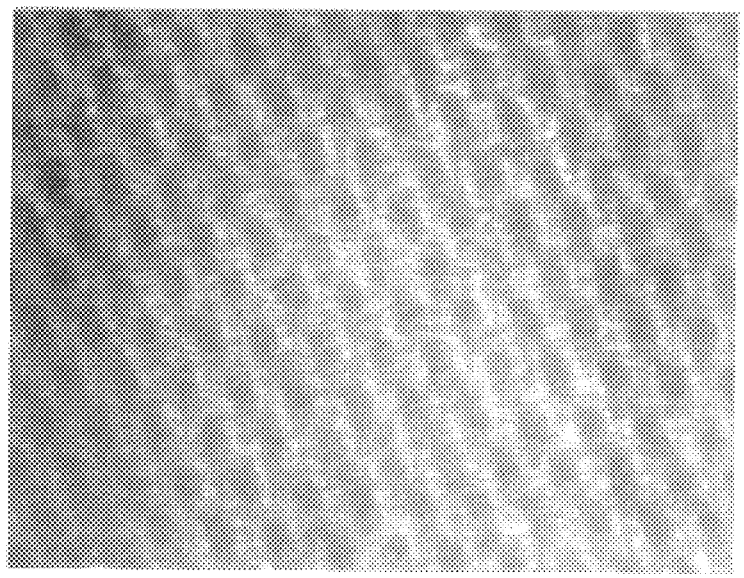
FIG. 9A and FIG. 9B are enlarged micrographs showing the surface conditions of the EL panel package film having pattern A transferred in Comparative Example 2, FIG. 9A being a micrograph magnified to 9.6 times, and FIG. 9B being a micrograph magnified to 48 times.
Figure 9B:
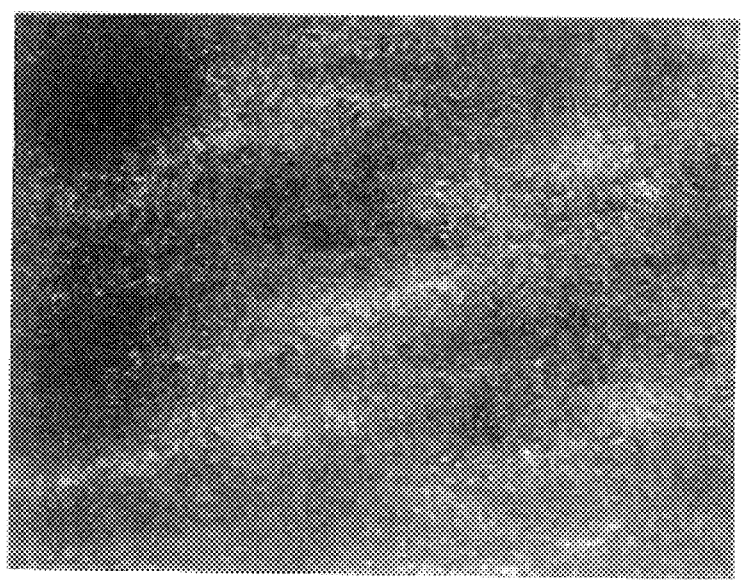
Figure 10A:
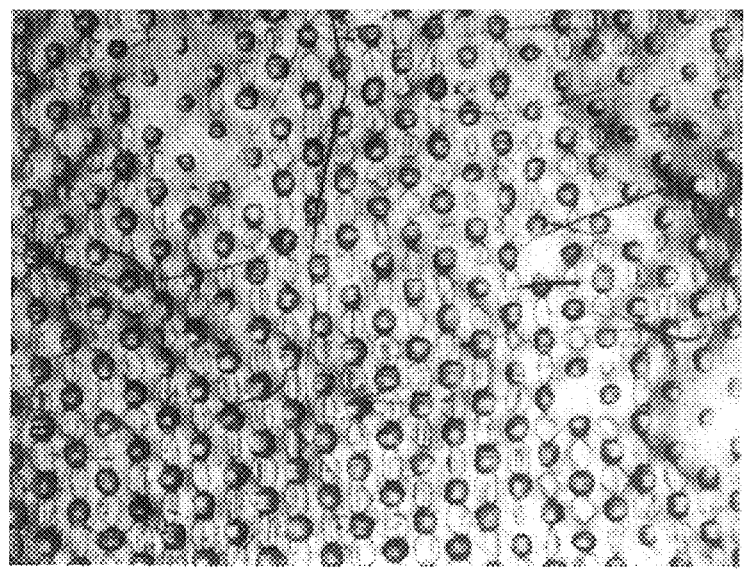
FIG. 10A and FIG. 10B are enlarged micrographs showing the surface conditions of the EL panel package film having pattern B transferred in Comparative Example 2, FIG. 10A being a micrograph magnified to 9.6 times, and FIG. 10B being a micrograph magnified to 48 times.
Figure 10B:
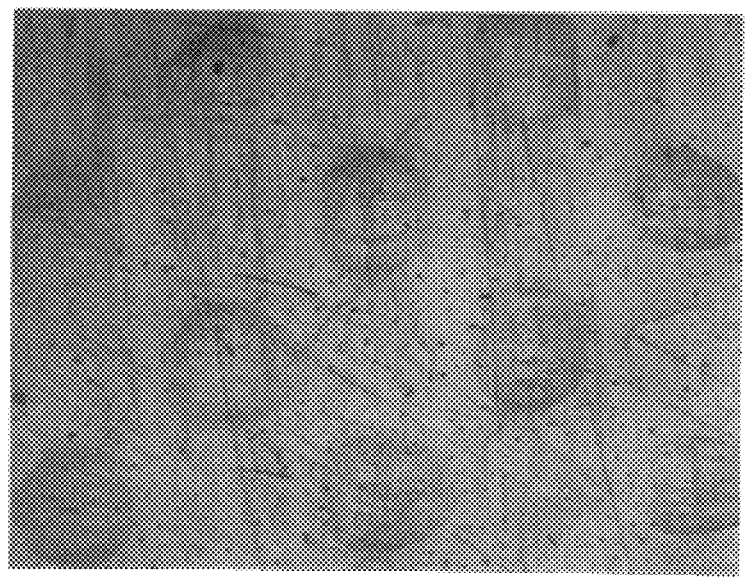
Figure 11A:
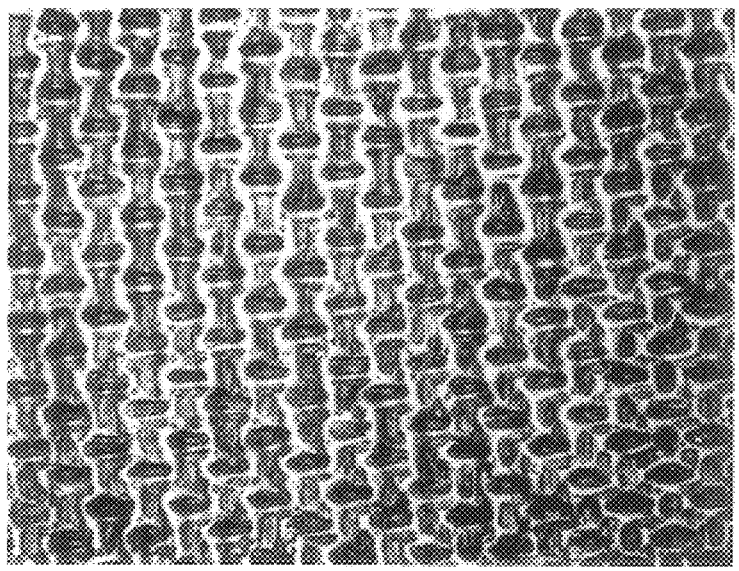
FIG. 11A and FIG. 11B are enlarged micrographs showing the surface conditions of the EL panel package film having pattern C transferred in Comparative Example 2, FIG. 11A being a micrograph magnified to 9.6 times, and FIG. 11B being a micrograph magnified to 48 times.
Figure 11B:
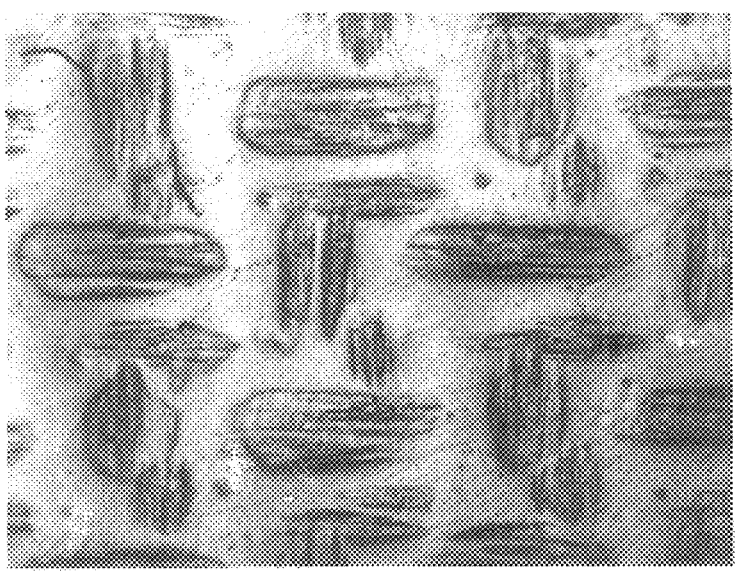

FIG. 9A and FIG. 9B show the surface condition of the EL panel package film having pattern A transferred in an enlarged state. FIG. 10A and FIG. 10B show the surface condition of the EL panel package film having pattern B transferred in an enlarged state. FIG. 11A and FIG. 11B show the surface condition of the EL panel package film having pattern C transferred in an enlarged state. Magnifications were the same as in Embodiment 1.

Figure 12:
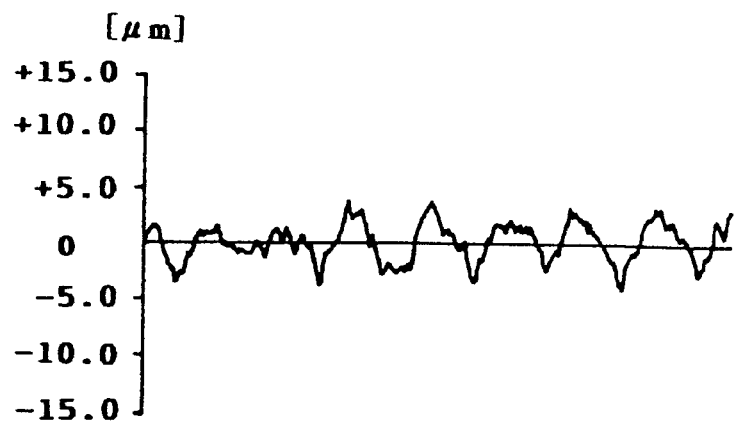
FIG. 12 is a chart showing a result of measurement of the surface roughness of the EL panel package film having pattern A transferred in Comparative Example 2.
Figure 13:
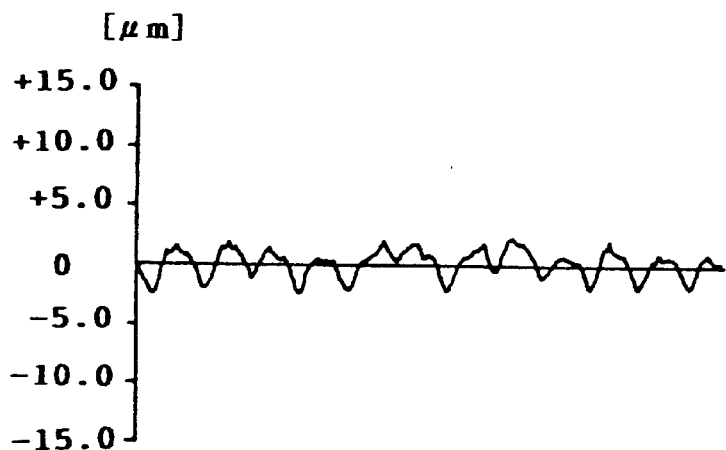
FIG. 13 is a chart showing a result of measurement of the surface roughness of the EL panel package film having pattern B transferred in Comparative Example 2.
Figure 14:
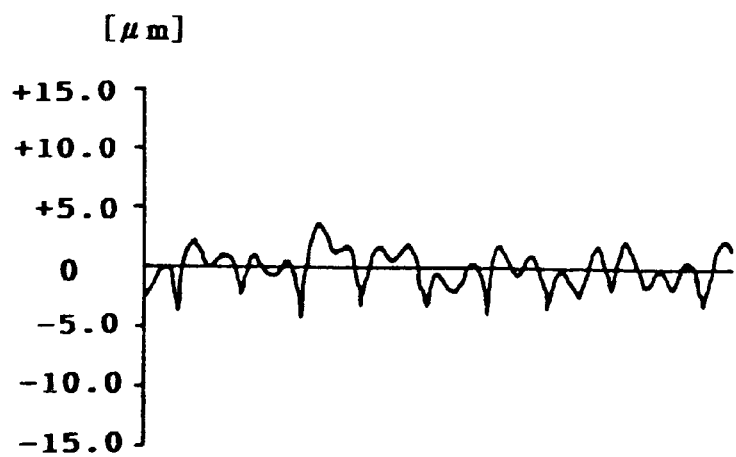
FIG. 14 is a chart showing a result of measurement of the surface roughness of the EL panel package film having pattern C transferred in Comparative Example 2.

The EL panel package films having respective patterns A, B, C transferred were measured for the surface roughness by the surface roughness measuring apparatus. As a result, the films having pattern A transferred had Ra of 1.3 to 1.8 $\mu$m and Ry of 8.0 to 9.0 $\mu$m. The films having pattern B transferred had Ra of 0.9 to 1.2 $\mu$m and Ry of 4.5 to 5.5 $\mu$m. The films having pattern C transferred had Ra of 1.1 to 1.4 $\mu$m and Ry of 7.5 to 8.5 $\mu$m. FIG. 12 shows a chart of results obtained by measuring the surface roughness of the films having pattern A transferred. FIG. 13 shows a chart of results obtained by measuring the surface roughness of the films having pattern B transferred. FIG. 14 shows a chart of results obtained by measuring the surface roughness of the films having pattern C transferred.

Using the respective EL panel package films of Embodiments 1, 2 and Comparative Examples 1, 2, the organic dispersion EL panel shown in FIG. 3 was produced by the usual method. The package film of each case was used as the package films 20, 21 which were paired for the front and back of the organic dispersion EL panel.

Compared with the EL panels using the package film not having the irregularities on the surface of Comparative Example 1, the EL panels using the package films having the three patterns A, B, C transferred in Comparative Example 2 were found having a little reduction of noises of less than 1 dB. But, noise could not be removed essentially. Meanwhile, the EL panels using the package films of Embodiment 1 and Embodiment 2 had noise reduced by several dB to 20 dB at maximum.

In addition, these EL panels were incorporated as the backlight for the LCD cell to produce respective LCD modules. Noise from the LCD cell surface of these LCD modules was evaluated. As a result, no significant difference was found in noise produced by using the package film of Comparative Example 2 as compared with a case of using the conventional package film of Comparative Example 1. On the other hand, where the package films of Embodiment 1 and Embodiment 2 were used, noise reduction of about 10 dB or more was found.

INDUSTRIAL APPLICABILITY

As apparent from the embodiments described above, the EL panel using the package film of the invention can prevent oscillations caused due to the polarity inversion of an alternate voltage applied without particularly changing the existing basic structure. Particularly, when it is incorporated as the backlight of the LCD cell into the LCD module, it makes great contributions for reduction of noise from the LCD cell.

What is claimed is:

1. An EL panel package film for an EL panel, comprising:
   irregularities of 3 μm or more in arithmetic average roughness Ra on both front and back surfaces of the EL panel, the arithmetic average Ra being expressed:

$$Ra = 1/L \int_0^L |f(x)| dx,$$

wherein f(x) is a surface roughness curve,
   wherein the EL panel package film has a substantially constant thickness and is made of a moistureproof film.

2. An EL panel package film for an EL panel, comprising:
   irregularities of 10 μm or more in maximum height Ry on both front and back surfaces of the EL panel, the maximum height Ry being determined as a distance between a peak line and a root line of a surface; and
   wherein the EL panel package film has a substantially constant thickness and is made of a moistureproof film.

3. An EL panel package film for an EL panel, comprising:
   irregularities of 3 μm or more in arithmetic average roughness Ra on both front and back surfaces of the EL panel, the arithmetic average Ra being expressed:

$$Ra = 1/L \int_0^L |f(x)| dx,$$

wherein f(x) is a surface roughness curve;
   the irregularities having 10 μm or more in maximum height Ry on both the front and back surfaces of the EL panel, the maximum height Ry being determined as a distance between a peak line and a root line of a surface; and
   wherein the EL panel package film has a substantially constant thickness and is made of moistureproof film.

4. An EL panel package, comprising:
   fine and continuous irregularities with a noise reduction effect on both front and back surfaces of the EL panel package,
   wherein the EL panel package has a substantially constant thickness.

5. The EL panel package film according to any one of claim 4, wherein the moistureproof film comprises a polychlorotrifluoroethylene film or a polyester film having a moistureproof layer.

6. An EL panel package film for an EL panel, comprising:
   irregularities arranged with a pitch of 0.3 to 1.0 mm on both front and back surfaces of the EL panel; and
   wherein the EL panel package film has a substantially constant thickness and is made of a moistureproof film.

7. An EL panel package film according to claim 6, wherein the irregularities are made by embossing.

8. An EL panel, comprising:
   an EL element portion having an emitter layer containing dispersed fluorescent particles, a transparent electrode layer formed to integrally oppose one of the main surfaces of the emitter layer, and a back electrode layer formed to laminate on the other main surface of the emitter layer with a reflective insulating layer interposed therebetween;
   a pair of leads being attached to the transparent electrode layer and the back electrode layer; and
   a pair of package films made of a moistureproof film holding the EL element portion between them,
   wherein the package films have irregularities of 3 μm or more in arithmetic average roughness Ra on both front and back surfaces of the EL panel and a substantially constant thickness, the arithmetic average Ra being expressed:

$$Ra = 1/L \int_0^L |f(x)| dx,$$

wherein f(x) is a surface roughness curve.

9. An EL panel, comprising:
   an EL element portion having an emitter layer containing dispersed fluorescent particles, a transparent electrode layer formed to integrally oppose one of main surfaces of the emitter layer, and a back electrode layer formed to laminate on the other main surface of the emitter layer with a reflective insulating layer interposed therebetween;
   a pair of leads being attached to the transparent electrode layer and the back electrode layer; and
   a pair of package films made of a moistureproof film holding the EL element portion between them,
   wherein the package films have irregularities of 10 μm or more in maximum height Ry on both front and back surfaces of the EL panel and a substantially constant thickness, the maximum height Ry being determined as a distance between a peak line and a root line of an surface.

10. An EL panel, comprising:
   an EL element portion having an emitter layer containing dispersed fluorescent particles, a transparent electrode layer formed to integrally oppose one of the main surfaces of the emitter layer, and a back electrode layer formed to laminate on the other main surface of the emitter layer with a reflective insulating layer interposed therebetween;
   a pair of leads being attached to the transparent electrode layer and the back electrode layer; and
   a pair of package films made of a moistureproof film holding the EL element portion between them,
   wherein the package films have irregularities of 3 μm or more in arithmetic average roughness Ra and 10 μm or more in maximum height Ry on both front and back surfaces of the EL panel and a substantially constant thickness, the arithmetic average Ra being expressed:

$$Ra = 1/L \int_0^L |f(x)| dx,$$

wherein f(x) is a surface roughness curve, and the maximum height Ry being determined as a distance between a peak line and a root line of an surface.

11. The EL panel according to any one of claims 8–10, wherein the moistureproof film comprises a polychlorotrifluorcethylene film or a polyester film having a moistureproof layer.

12. An LCD module, comprising the EL panel described in any one of claims 8 through 10.

13. An EL panel, comprising:

an EL element portion having an emitter layer containing dispersed fluorescent particles, a transparent electrode layer formed to integrally oppose one of the main surfaces of the emitter layer, and a back electrode layer formed to laminate on the other main surface of the emitter layer with a reflective insulating layer interposed therebetween;

a pair of leads being attached to the transparent electrode layer and the back electrode layer; and a pair of package films made of a moistureproof film holding the EL element portion between them, wherein the package films have irregularities arranged with a pitch of 0.3 to 1.0 mm on both front and back surfaces of the EL panel and a substantially constant thickness.

14. The EL panel according to any one of claims 8–10, wherein the package film has irregularities arranged with a pitch of 0.3 to 1.0 mm on both the front and back surfaces.

* * * * *

UNITED STATES PATENT AND TRADEMARK OFFICE
CERTIFICATE OF CORRECTION

PATENT NO. : 6,225,741 B1
DATED : May 1, 2001
INVENTOR(S) : Nakamura et al.

Page 1 of 1

It is certified that error appears in the above-identified patent and that said Letters Patent is hereby corrected as shown below:

Title page, Item [54] and Column 1, lines 1-3,
Change "PACKAGE FILM FOR EL PANEL, ITS MANUFACTURE, AND EL PANEL AND LCD MODULE EMPLOYING THE FILM" to -- EL PANEL PACKAGE FILM, PRODUCTION METHOD THEREOF, AND EL PANEL AND LCD MODULE USING THE PACKAGE FILM --.

Column 10, claim 5,
Line 2, change "claim 4" to -- claims 1-4 --.

Signed and Sealed this

Twenty-sixth Day of March, 2002

Attest:

Attesting Officer

JAMES E. ROGAN
*Director of the United States Patent and Trademark Office*